United States Patent
Smallwood et al.

(10) Patent No.: US 9,769,434 B1
(45) Date of Patent: Sep. 19, 2017

(54) REMOTE CONTROL OF A USER'S WEARABLE COMPUTING DEVICE IN HELP DESK APPLICATIONS

(71) Applicant: CA, Inc., Islandia, NY (US)

(72) Inventors: Connie Smallwood, Cary, NC (US); Steven L. Greenspan, Scotch Plains, NJ (US)

(73) Assignee: CA, Inc., New York, NY (US)

( * ) Notice: Subject to any disclaimer, the term of this patent is extended or adjusted under 35 U.S.C. 154(b) by 561 days.

(21) Appl. No.: 14/448,214

(22) Filed: Jul. 31, 2014

(51) Int. Cl.
  *H04N 7/18* (2006.01)
  *H04N 5/232* (2006.01)
  *H04N 5/225* (2006.01)

(52) U.S. Cl.
  CPC ........... *H04N 7/185* (2013.01); *H04N 5/2252* (2013.01); *H04N 5/23206* (2013.01)

(58) Field of Classification Search
  CPC .............................. H04N 7/185; H04N 5/2252
  See application file for complete search history.

(56) References Cited

U.S. PATENT DOCUMENTS

| 2009/0033736 A1* | 2/2009 | Thomason | ............ | H04N 7/147 348/14.02 |
| 2013/0018803 A1* | 1/2013 | Challu | .................. | G06Q 10/06 705/304 |
| 2014/0007012 A1* | 1/2014 | Govande | ................ | G06Q 30/02 715/835 |
| 2014/0368980 A1* | 12/2014 | Nanavati | ................ | G06F 1/163 361/679.03 |
| 2015/0009348 A1* | 1/2015 | Vartanian | ............... | H04N 7/183 348/211.3 |

OTHER PUBLICATIONS

Kraut R. et al., "Visual Information as a Conversational Resource in Collaborative Physical Tasks", Human-Computer Interaction, 2003, pp. 13-49, vol. 18, Lawrence Erlbaum Associates, Inc.

* cited by examiner

*Primary Examiner* — Tung Vo
*Assistant Examiner* — Rowina Cattungal
(74) *Attorney, Agent, or Firm* — Coats & Bennett, PLLC

(57) ABSTRACT

An application server based in a communication network facilitates help desk support for end users that employ a camera-equipped wearable device. Upon receiving a request from a user for assistance with a problem or task, the application server controls the wearable device to collect multimedia information—e.g., images, video, and sounds—associated with an object of the task. The application server then crowdsources the collected multimedia information to a plurality of other remote user devices. Based on helpful information received from users of the remote devices, and/or an analysis performed at the server, the application server categorizes the task. So categorized, the application server can retrieve pertinent assistance data associated with the task and send that information to the user.

16 Claims, 7 Drawing Sheets

REMOTE CONTROL OF A USER'S WEARABLE COMPUTING DEVICE IN HELP DESK APPLICATIONS

BACKGROUND

The present disclosure relates generally to help desk systems, and particularly to help desk systems that categorize problems for which end users request assistance.

Help desk systems generally provide end users with information and support regarding a problem or issue being experienced by the end users. While useful, the options available to the end users for facilitating a solution to a given problem, as well as to the help desk personnel that provide the assistance, are limited with conventional systems. However, there have been past attempts at streamlining help desk systems. For example, some help desk systems execute special software that allows a help desk attendant to remotely assume control of an end user's system and run diagnostics to determine the nature of a problem. Once the problem has been properly diagnosed, the help desk attendant can interact directly with the end user's system to resolve the problem.

Such systems, however, are typically complex and present many different challenges that help desk attendants must consider if they are to effectively assist an end user and resolve an issue. Consider, for example, cases in which an end user's device is incompatible with the applications and/or systems utilized by the help desk attendant. In these types of situations, it is difficult for help desk attendant to connect with, and control, the end user's device. Further, some end user's, such as the government and financial institutions, have legitimate security concerns. Thus, certain security controls may be active on the end user's device that hinder or prevent the help desk attendant from accessing that device.

Security and privacy issues are also of particular concern in the consumer sector. Many end users store private information on their computing devices, for example, that they do not wish to publicize. Additionally, the vast array of Internet Service Providers (ISPs), home network and device configurations, and types of computing devices compound the difficulties in connecting with, and controlling, the end user's device. Considering these types of difficulties, many conventional help desk systems rely on standard scripts and diagnostic procedures. Particularly, the attendants can refer to these scripts and procedures when guiding the user through performing the steps detailed in the procedures. Such practices assume that end users, with instructions from the help desk attendant, are savvy enough to perform the technical procedures that are necessary to solve an issue.

BRIEF SUMMARY

The present disclosure provides a computer-implemented method, an apparatus, and a computer readable medium that facilitates help desk support for end users that employ a wearable device equipped with one or both of a camera and a microphone. In particular, when end users request assistance with a particular task or problem, a computing device such as a network server autonomously controls a wearable device being worn by the requesting end user to capture multimedia information associated with an object of the task or problem. The multimedia information are digital representations of the object, and may comprise, for example, images, videos, audible sounds, and the like. The computing device then crowdsources that multimedia information to a plurality of remote devices. If the server receives any helpful information regarding the task or multimedia information from users of the remote devices, the server utilizes that helpful information to categorize the task. Once categorized, the server can locate and retrieve assistance data about the task, and send that assistance data to the user that requested assistance.

In one embodiment, the present disclosure provides a computer-implemented method for categorizing a task for which a user requested assistance, and for providing the user with the assistance based on the categorization. More particularly, the method calls for receiving, at a server device, a request for assistance with a task from a user via a communications network. In response to receiving the request, the method calls for controlling a camera or a microphone, for example, on a wearable device worn by the user to capture multimedia information associated with an object. The object is associated with the task and may be positioned within the user's field of view. The method also recites receiving, at the server device, the multimedia information from the wearable device, and crowdsourcing the multimedia information to a plurality of remote devices. Based on information received from a remote device about the captured multimedia information, the method determines, at the server device, a category for the task. So known, the method calls for retrieving assistance data based on the category of the task, and sending the assistance data from the server device to the wearable device worn by the user.

In another embodiment, the present disclosure provides an application server that comprises a communications interface circuit and a processor circuit. The communications interface circuit is configured to receive a request for assistance with a task from a user via a communications network. The processing circuit, which is communicatively connected to the communications interface, is configured to control, responsive to receiving the request, a wearable device worn by the user to capture multimedia information associated with an object. The object is associated with the task and may be positioned within the user's field of view. The processor circuit is further configured to receive the multimedia information from the wearable device, crowdsource the multimedia information to a plurality of remote devices, and determine a category for the task, based on information received from a remote device, about the captured multimedia information. Once the category is determined, the processor circuit is configured to retrieve assistance data based on the category of the task, and send the assistance data from the server device to the wearable device worn by the user.

In another embodiment, the present disclosure provides a computer program product comprising a computer-readable medium. The computer-readable medium is configured to store a control application that, when executed by a processing circuit on an application server, configures the processing circuit to receive a request for assistance with a task from a user via a communications network, and control, responsive to receiving the request, a wearable device worn by the user to capture multimedia information associated with an object. The object is associated with the task, and in at least some embodiments, is positioned within the user's field of view. Additionally, the control application also configures the processing circuit to receive the captured multimedia information from the wearable device, crowdsource the multimedia information to a plurality of remote devices, determine a category for the task based on information received from a remote device about the captured multimedia information, and retrieve assistance data based on the category of the task. Once retrieved, the control application can cause the processor circuit to send the assistance data from the server device to the wearable device worn by the user.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
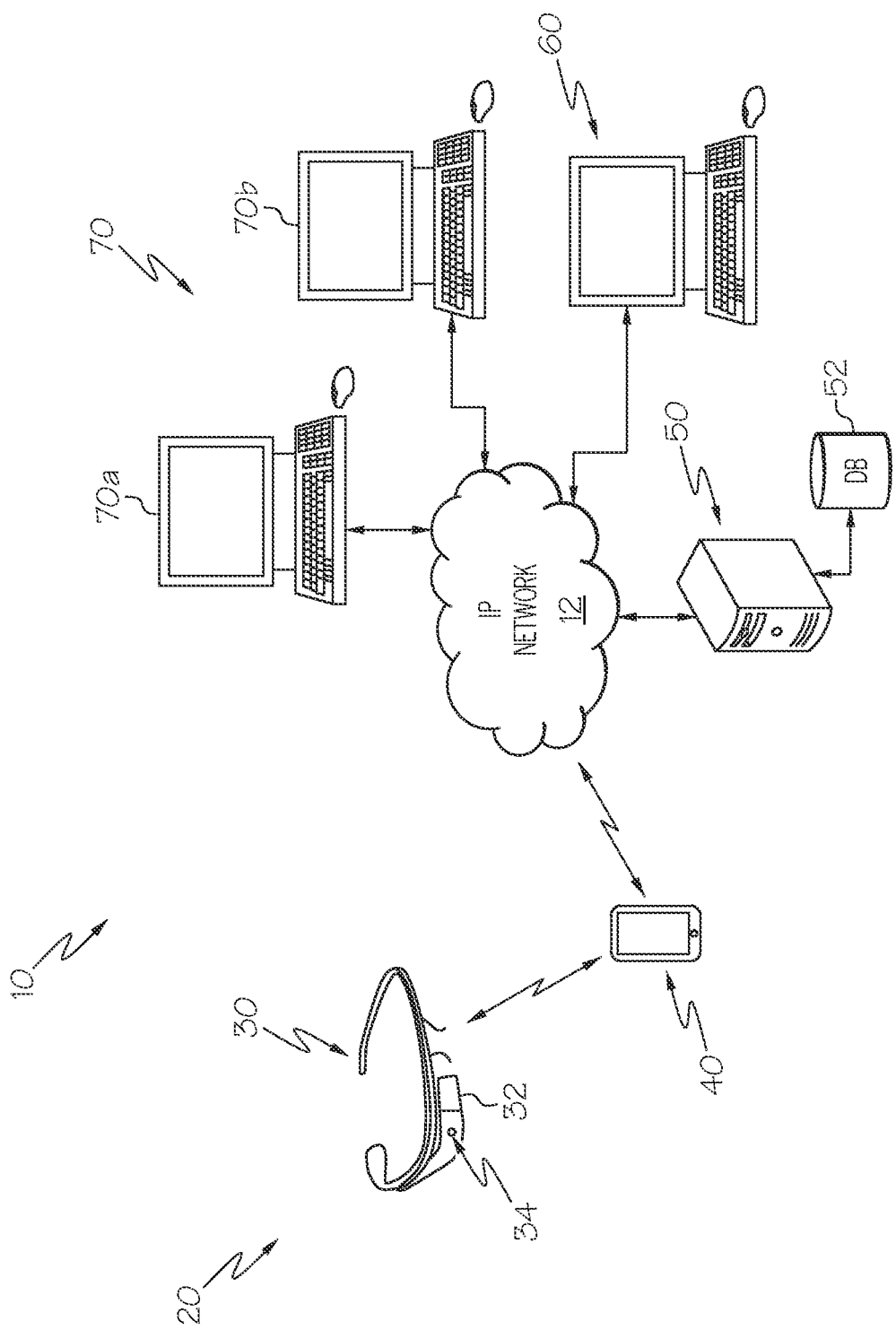
FIG. 1 is a block diagram illustrating a system configured to function according to one embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, the present disclosure provides a method, apparatus, and computer-readable medium for providing help desk support to end users that employ a wearable computing device. In embodiments of the present disclosure, an integrated help desk system autonomously gathers multimedia information about a problem or task for which an end user requests assistance. More particularly, the system controls the user's wearable computing device to capture images and/or video of objects associated with the request, and/or the audible sound emitted by such objects. The system then crowdsources that gathered multimedia information and categorizes the problem or task based on information received from one or more other users that may have knowledge about the task and/or object(s) associated with the multimedia information. Once categorized, the system may provide a variety of pertinent solutions and assistance to the user. At any point in time, a help desk attendant can monitor the data being communicated in association with an ongoing end user request for assistance for trends and patterns related to the request. If detected, the attendant can proactively utilize information associated with the detected trends and patterns to provide assistance to the end user in the form of updated documentation, forum postings, direct communications with the user, and the like.

Turning now to the drawings, FIG. 1 is a block diagram illustrating some functional components of the help desk system 10 according to one embodiment of the present disclosure. As those of ordinary skill in the art will readily appreciate, the components seen in FIG. 1 are merely illustrative of the components comprising the system 10. Other components may or may not be present in system 10 as is known in the art.

As seen in FIG. 1, help desk system 10 comprises an IP network 12, such as the Internet, for example, that interconnects a wearable computing device 30, a mobile device 40, a workstation 60 of a help desk attendant, and a plurality of remote end user devices 70a, 70b (collectively, remote end user devices 70) to an application server 50. The application server 50 is further communicatively connected to a Knowledgebase (KB) or Database (DB) 52 that stores, inter alia, assistance data that comprises solutions, diagnostics, and other information for one or more tasks. In accordance with the embodiments of the present disclosure, assistance data may be retrieved from KB 52 and provided to an end user that requested assistance with a task.

Figure 2:
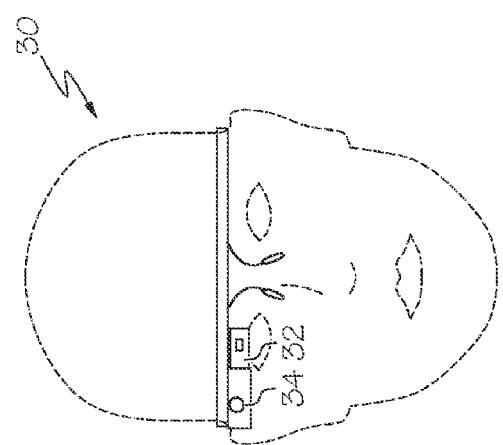
FIG. 2 is a perspective view illustrating a wearable computing device configured to operate according to one embodiment of the present disclosure

In this embodiment, the wearable computing device 30 comprises an augmented eyewear device such as a GOOGLE GLASS, for example, that is worn on the user's head (see FIG. 2). Such wearable devices 30, are well-known in the art, and thus, not described in great detail here. However, it should be stated that a wearable device 30 configured to operate with embodiments of the present disclosure comprises a visual overlay 32 that displays information to an end user of the device 30, and a user interface portion 34 that includes a camera for capturing images and video, a microphone for capturing audible sound, and a speaker for rendering audible sound to the user. In addition to the audio/video capabilities, a wearable device 30 configured according to the present disclosure also comprises a processor circuit capable of executing mobile applications, and a communications interface circuit capable of transmitting and receiving data with remote devices via a wireless interface.

The mobile device 40 may comprise any mobile communications device known in the art. Some examples of suitable mobile devices 40 include, but are not limited to, cellular telephones and various types of computing devices, such as tablet computers, notebook and laptop computers, desktop computers, and the like. According to the present disclosure, mobile device 40 communicatively connects to the wearable device 30 via a short-range radio communications protocol, such as the well-known BLUETOOTH protocol, for example, and brokers communications between the wearable device 30 and the network-based components of system 10. Communications between the wearable device 30 and the mobile device 40, as well as between the wearable device 30 and the network components, may be realized using protocols, messaging, and signaling that is well-known in the art.

Those of ordinary skill in the art should appreciate that the presence of a mobile device 40 may or may not be required to practice the embodiments described herein. In some embodiments, the wearable device 30 may not comprise the communication components (e.g., a transceiver) that would allow the wearable device 30 to communicate with other devices via an IP network 12 and/or other wireless networks, such as a cellular access network, for example. In these cases, the mobile device 40 could link to the wearable device 30 via BLUETOOTH, for example, and broker communications between the wearable device 30 and the other components of system 10. In other embodiments, however, wearable device 30 may comprise all the components needed to communicate with the components of system 10 via IP network 12, and thus, mobile device 40 would not be required.

Application server 50 may comprise any computer server known in the art capable of communicating data packets over IP network 12. In embodiments of the present disclosure, application server 50 receives user requests for assistance via IP network 12, and then crowdsources information related to those requests to the plurality of remote end user devices 70. The users of those devices 70 then provide information back to the application server 50. Based on this information, application server 50 categorizes the problem for which the user requested assistance, and provides the user with assistance data to help the user perform a task related to the request.

The assistance data may comprise any data or information needed or desired. By way of example only, such assistance data includes, but is not limited to, images, videos, documentation, forum postings, steps to perform in a diagnostics or solution method, identities of one or more experts in a given category, and the like. Further, such assistance data may be stored in KB 52. As previously stated, the application server 50 retrieves the assistance data from KB 52 to provide to an end user in response to a request for assistance, and also proactively updates the KB 52 with new or updated information as needed. Additionally, a help desk attendant at workstation 60 may monitor the communications related to end user requests for assistance for trends or patterns. Using the information that comprises the trends and patterns, the help desk attendants 60 can proactively provide assistance to the requesting end users, as well as update assistance data already stored in KB 52.

In operation, an end user wearing the wearable device 30 contacts the application server 50 to request assistance with a particular problem or task. For example, the user may request assistance with correcting an error on a home computer or fixing an engine component on a car. In response to the request, the application server 50 autonomously generates control signals to send to the wearable device 50. The control signals, when received at the wearable device 30, control the camera on wearable device 30 to capture an image or video of an object that is associated with the task. For the purposes of the embodiments described herein, the term "image" is intended to refer to still images as well as to video. Alternatively, or in addition, the control signals may control the microphone at wearable device 30 to record audible sound emitted or rendered by the object that is associated with the task. The application server 50 then crowdsources the captured image and/or recorded sound to the plurality of remote end user devices 70. The users of those devices 70, in turn, view and/or hear the images and sounds, and then provide information back to the application server 50 about those images and/or sounds, and/or the objects associated with the images and/or sounds. Using this information, the application server 50 can quickly categorize the task for which the user requested assistance, retrieve assistance data for the task from KB 52 based on the categorization, and send the assistance data to the requesting end user's wearable device 30 to help that user perform the task. For example, the application server 50 may provide the user with a document detailing the steps of a diagnostic procedure, part information, or the identity and contact information of one or more people that are knowledgeable about the specific task. That information is displayed on the visual overlay 32 of the wearable device 30 for the end user so that he/she may reference the information.

In some cases, the user of wearable device 30 may establish communications with an expert identified by the application server 50. In these situations, a help desk attendant 60 and/or the application server 50 can monitor the communications between the user and the expert to detect patterns or trends related to the task for which the end user requested assistance. If detected, this information may be extracted and used to update existing information in KB 52 so that it is subsequently available to help other end users having similar problems or issues. In some embodiments, the extracted data, and/or the captured images, video, and sounds, may be annotated and stored in KB 52.

Figure 3:
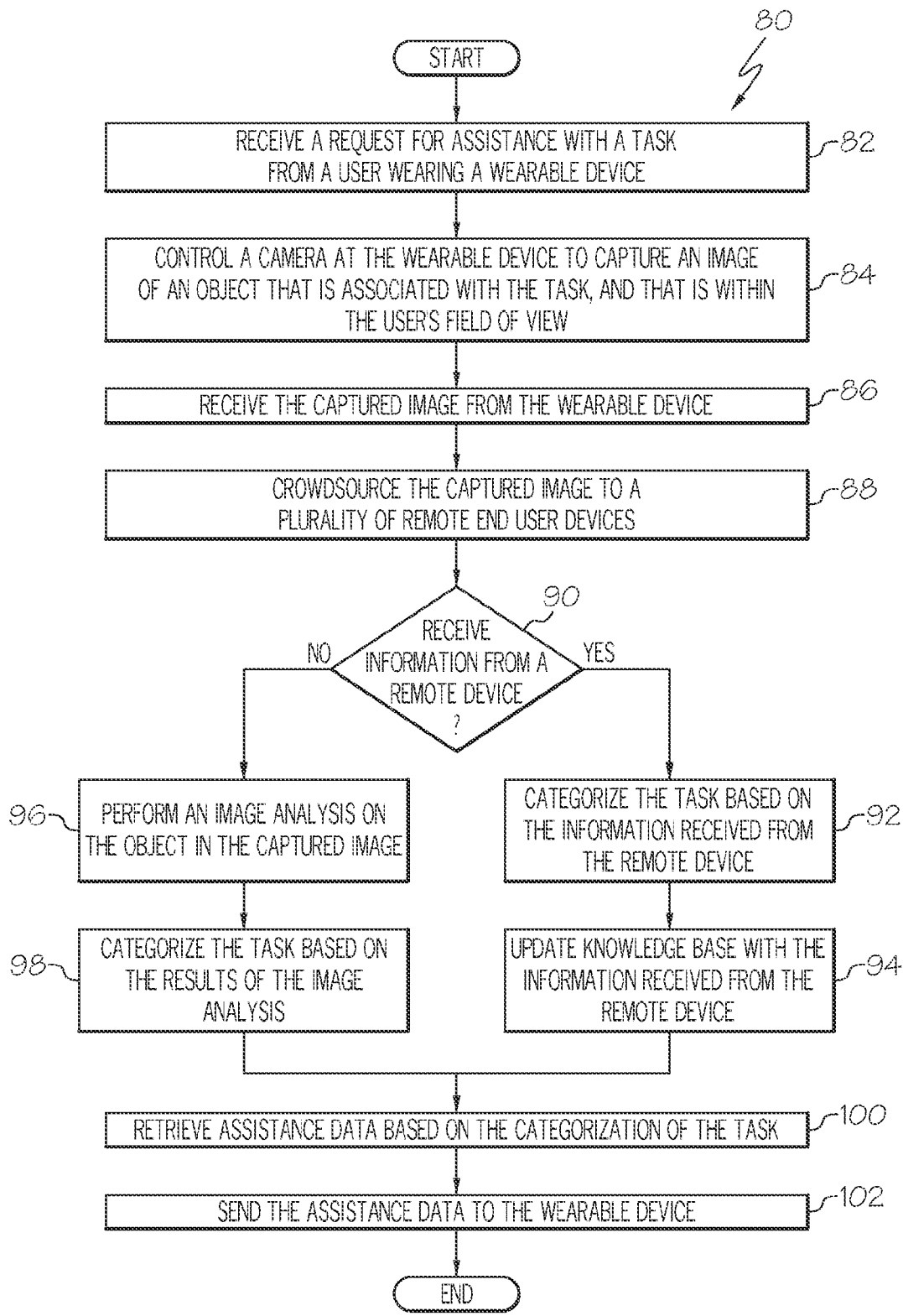
FIG. 3 is a flow diagram illustrating a method for controlling a camera on a wearable device worn by a user according to one embodiment of the present disclosure.

FIG. 3 is a flow diagram illustrating a method 80 of categorizing a task for which a user requests assistance, and for providing the user with data that will assist him/her with the task. In this embodiment, the application server 50 first receives a request (e.g., a request message) from the user for assistance with performing a task, such as fixing or diagnosing a problem with the user's car or home computer, for example (box 82). As stated above, the user is wearing a wearable computing device 30. Additionally, the request message may be sent by the mobile device 40 that is associated with the end user, or in some cases, by the wearable device 30 being worn by the end user. In these latter cases, the wearable device 30 could be configured to communicate with the application server via an access point in a Wireless Access Network (WAN) and the Internet, for example.

In accordance with the present disclosure, the application server 50, upon receiving the user request, generates a control signal and sends that signal back to the user's wearable device 30 via IP network 12. As seen in more detail later, the control signal may be generated to control a variety of functions on the wearable device 30. However, in this embodiment, the control signal is sent to the wearable device 30 to control a camera on wearable device 30 to capture an image of an object that is associated with the task (box 84). By way of example only, the application server 50 may control the camera to capture an image of an error code on a display screen of the user's home computer. In another example, the camera may be controlled by the control signal to capture an image of an engine component of a car. Regardless of the object and the task, however, the object is within the user's field of view. In cases where the object is not in the field of view, the application server 50 may generate other control signals to control some other functions of the camera, such as a pan function, a focus function, and/or a zoom function. Application server 50 may be configured to autonomously generate these control signals to remotely control these camera functions, or in response to receiving corresponding predefined commands from help desk attendant 60 or one or more remote end user devices 70.

Once captured, the wearable device 30 sends the image back to the application server 50 via IP network 12 (box 86). Upon receipt, the application server 50 crowdsources the received image to the plurality of remote end user devices 70 (box 88). Particularly, the application server 50 sends a message comprising the image received from the wearable device 30 to multiple other end users. These other end users may include undefined users (i.e., part of the public at-large online community), but may also include, or be a part of, a community of specified people that are especially knowledgeable about the task or object. Thus, upon receiving the image, one or more of these end users may provide ideas, information, and other data regarding the task and/or the object in the image. The application server 50 can then use the information provided by these other end users to categorize the task for which the user requests assistance (box 90).

For example, one or more of the remote end user devices 70 may provide, in a message to the application server 50, information that identifies the object in the image, along with assistance data that details the steps the user must take to perform the task. In such cases, the application server 50 can use this information to categorize the task (box 92). For example, the assistance data may comprise a detailed list of steps to perform to solve or troubleshoot a problem, an identity and contact information of a person or organization that is willing to provide detailed help to the user, a request for additional information from the user (e.g., additional images or video), an identification of the object in the image, and the like. The application server 50 may parse this incoming information and select keywords for comparison to a set of predefined keywords that is cross-referenced to one or more predetermined tasks. If a match occurs between keywords, the application server 50 can then identify a category for the task. Additionally, the assistance data received from the remote end user devices 70 may be stored in the KB 52 (box 94), or used to update existing assistance data in KB 52, such that the data is available for use in response to subsequent assistance requests for the same or similar problems.

In some cases, the remote end users 70 may not be able to provide helpful information for use in categorizing the task. Such may occur, for example, if none of the remote end users are knowledgeable about the task or object, or if none of the remote end users provide assistance within a predefined time period. In these situations, the application server 50 is further configured to perform an image recognition analysis on the captured image of the object (box 96). There are many known image analysis methods and algorithms that are suitable for use by an application server 50 configured according to the present disclosure, and thus, the particular imaging algorithm that is employed to analyze the image is not important. The image recognition analysis may result, for example, in the identification of an engine part in the user's vehicle, or in the recognition of an error code displayed on a display of the user's computer. Once the captured image has been analyzed, the application server 50 can categorize the task for which the user requested assistance based on that analysis (box 98), and also update the KB 52 with the results of the analysis, as needed.

Regardless of the categorization, application server 50 utilizes the categorization to search for assistance data related to the object (e.g., the particular identified engine component or error code) (box 100). The assistance data may be retrieved from the KB 52, or from some other data source available to the application server 50 via the IP network 12. Once retrieved, the application server 50 sends the assistance data to the requesting user (box 102).

Figure 4:
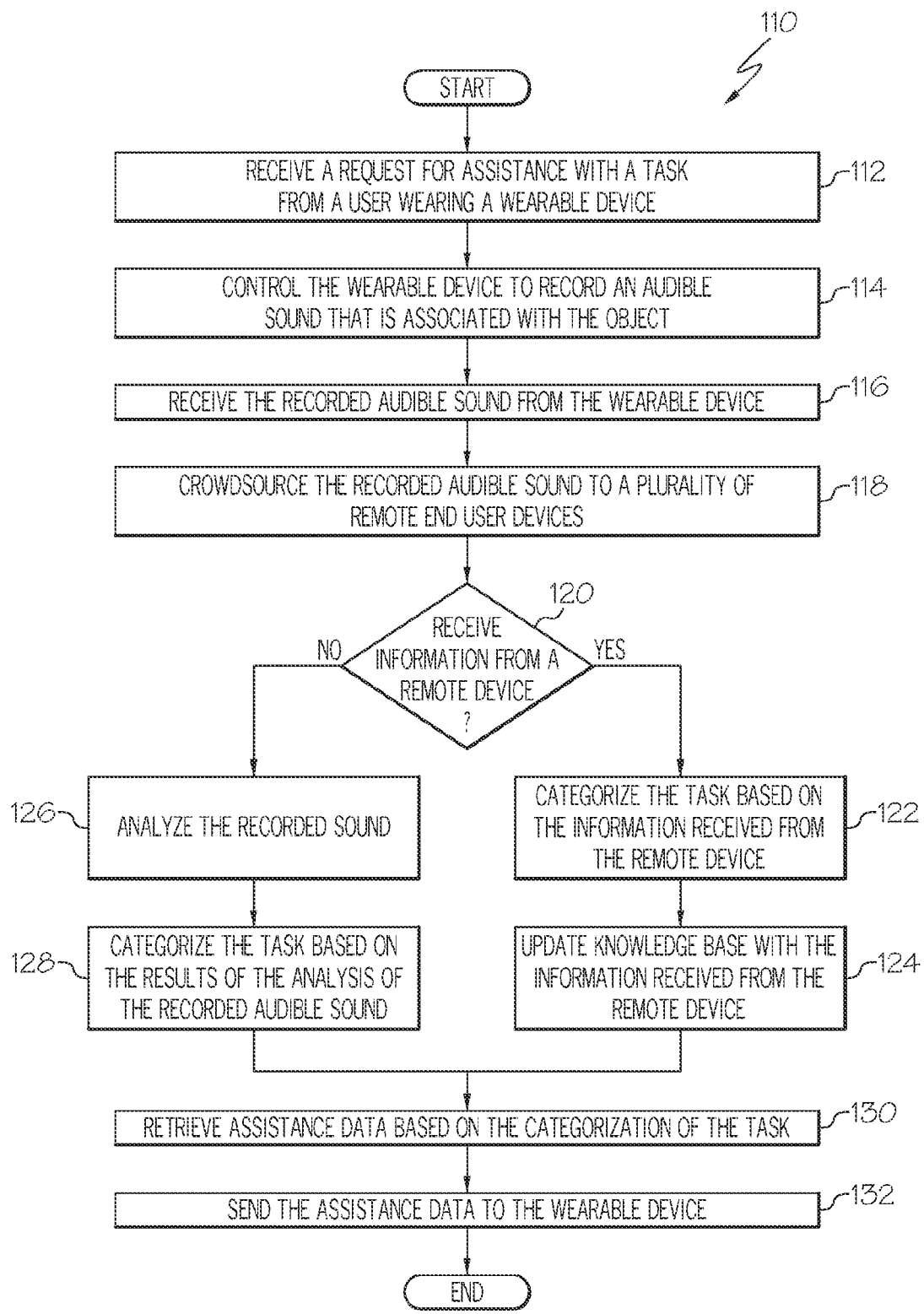
FIG. 4 is a flow diagram illustrating a method for enabling a microphone on a wearable device worn by a user according to one embodiment of the present disclosure.

Those of ordinary skill in the art will appreciate that the present disclosure is not limited to categorization of an object associated with a task based on an image or video of the object. In other embodiments, such as the method 110 in FIG. 4, the present disclosure utilizes an audible sound emitted by an object associated with a task to categorize the task.

Particularly, the application server 50 first receives a request from the end user requesting assistance with a task (box 112). For the sake of illustration only, the request may comprise a request for assistance with the user's car. In response to receiving the request, the application server 50 may generate a control signal to enable a microphone on the wearable device 30 (box 114). Once enabled, the microphone at the wearable device 30 would be enabled to record audible sound emitted by an object associated with the task (e.g., the engine or a particular engine component). The wearable device 30 would then send the recorded audible sound to the application server 50 in a message via IP network 12.

Upon receiving the recorded audible sound (box 116), the application server 50 will crowdsource the recorded sound to the plurality of remote end user devices 70 (box 118). As stated above, the remote end user devices 70 may be operated or associated with various unknown end users, or by a group of people considered experts in their field. Regardless of the knowledge of the end users, however, the application server 50 may or may not receive information from one or more of the remote end user devices (box 120). If information is received from one or more of the plurality of remote end user devices 70, the application server 50 categorizes the task based on the received information (box 122) and updates the KB 52 with the information, as previously described. Otherwise, the application analyzes the sound recording, using any algorithm known in the art, and categorizes the task based on the results of that analysis (box 128). The application server then retrieves assistance data for the end user from the KB 52 and/or other data source based on the categorization of the task (box 130), and sends that assistance data to the wearable device 30 being worn by end user that requested the assistance (box 132).

The previous embodiments categorize the task based on the use of captured images or recorded audio. However, those of ordinary skill in the art should readily appreciate that the present disclosure is not so limited. In some embodiments, the present disclosure utilizes both a captured image and a recorded sound. In such cases, the application server 50 may generate first and second separate control signals to capture the image and sound recording, respectively, and then crowdsource the captured image and recorded sound together or separately to the plurality of end user devices 70. In each case, however, the application server 50 is configured to receive information from the one or more remote users 70 regarding the task, and/or to analyze the information, and to use the information and results of the analysis to categorize the task for which the user requested assistance.

As previously stated, the object associated with the task is generally within the user's field of view, thereby enabling the capture of the image and/or video. However, there are some situations in which the camera at the wearable device 30 may not be centered on the object associated with the task. In other situations, a "close-up" of the object may be desired so that a remote end user, or the help desk attendant, can have a better or clearer view. Further, the images of the object may be annotated by the end user, the remote end users 70, or the help desk attendant 60, and stored for retrieval responsive to subsequent help requests.

Figure 5:
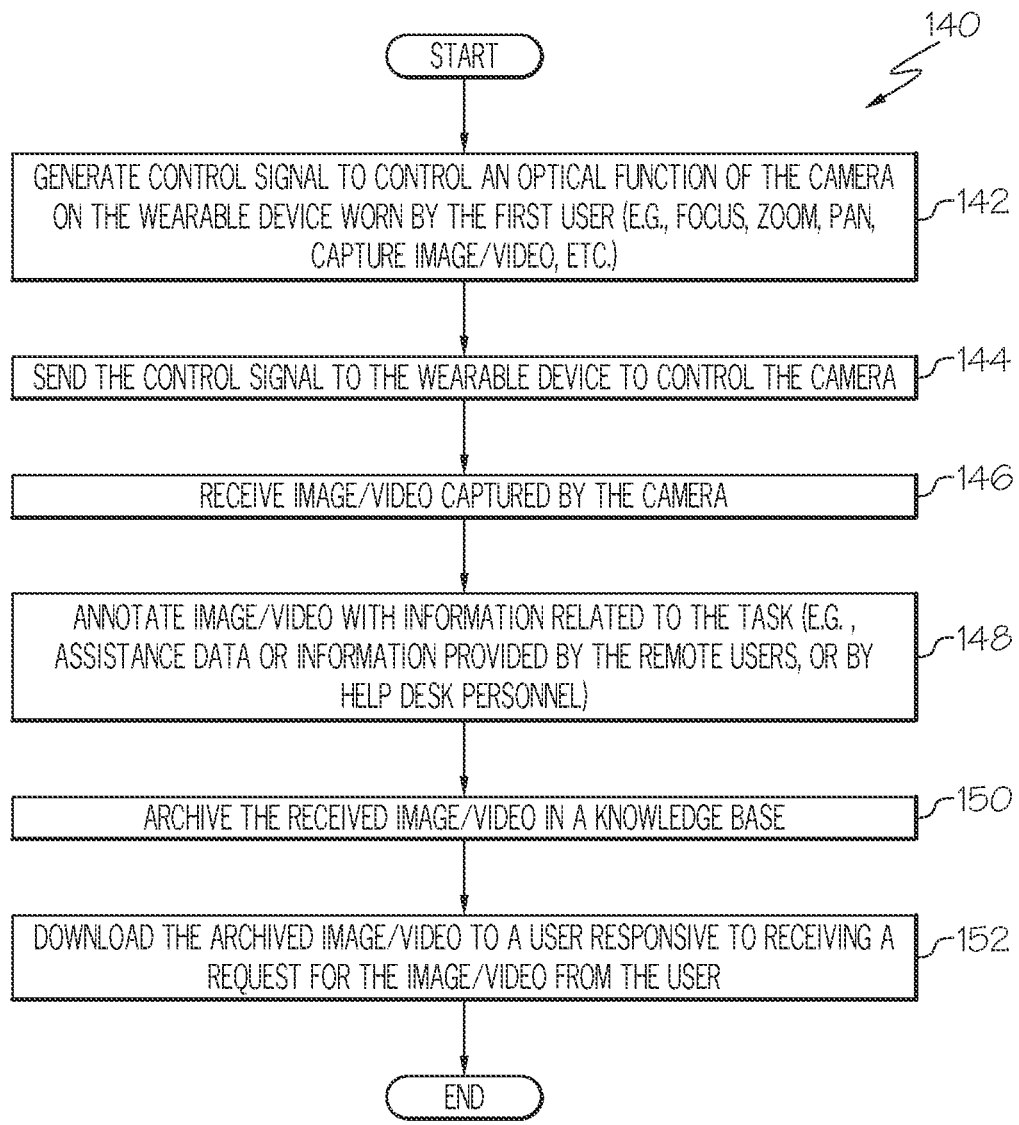
FIG. 5 is a flow diagram illustrating a method for automatically updating a knowledge base with assistance information based on the monitored communications between two users.

Therefore, as seen in FIG. 5, a method 140 of the present disclosure allows the application server 50 to control a variety of functions of the camera at the wearable device. Particularly, the control signals may be separately generated by application server 50 (box 142) and sent to the wearable device 30 (box 144) to control each of the focus, zoom, or pan functions of the camera of the wearable device 30. It is also possible to control other functions not specifically identified here. The control signals may be generated, for example, in response to receiving a request from one or more of the help desk attendant and the remote end user devices 70. The wearable device 30, upon receipt of the control signals, performs the commanded functions as previously stated and returns the images captured of the object to the application server 50. Upon receipt of the images (box 146), the application server 50 annotates the images (box 148) using information provided by the end user that requested assistance, the remote end user devices 70, the help desk attendant 60, or a combination thereof. The annotated image is then archived in a storage medium, such as in KB 52, for example (box 150). Subsequently, the archived image may be downloaded to other users to assist them with a task (box 152).

Figure 6:
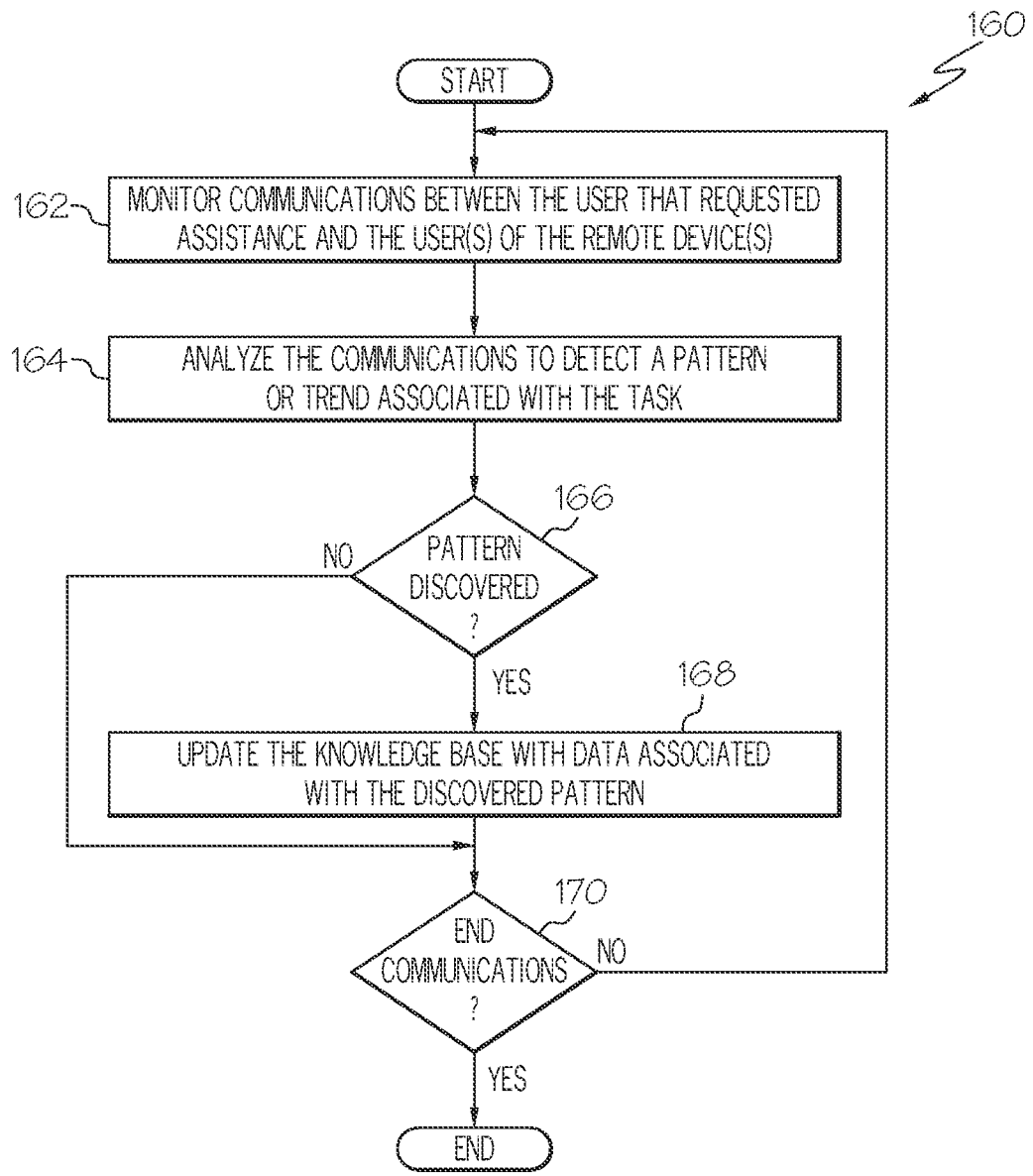
FIG. 6 is a flow diagram illustrating a method for controlling optical functions of the camera at the wearable device, and for providing images and video for download to other users according to one embodiment of the present disclosure.

As previously stated, the help desk attendant 60 can monitor communications between users, and extract information that may be placed into the KB 52. More particularly, as seen in FIG. 6, the application server 50 monitors the communications between the user that requested the assistance for a particular task, and one or more remote end users 70 that are providing the requested help (box 162). The communications may be monitored "passively" (i.e., in the background), but in at least one embodiment, are analyzed by the application server 50 to detect any patterns or trends that are related to the task exist in the information being communicated (box 164). Many different algorithms for detecting patterns and trends are known in the art, and any of those algorithms may be employed by the application server 50. If a pattern or trend is detected (box 166), the application server 50 extracts the information from the communications and stores it in KB 52 (box 168). The monitoring function, as described in FIG. 6, may continue until the communications between the users and the remote end users 70 ends (box 170).

Figure 7:
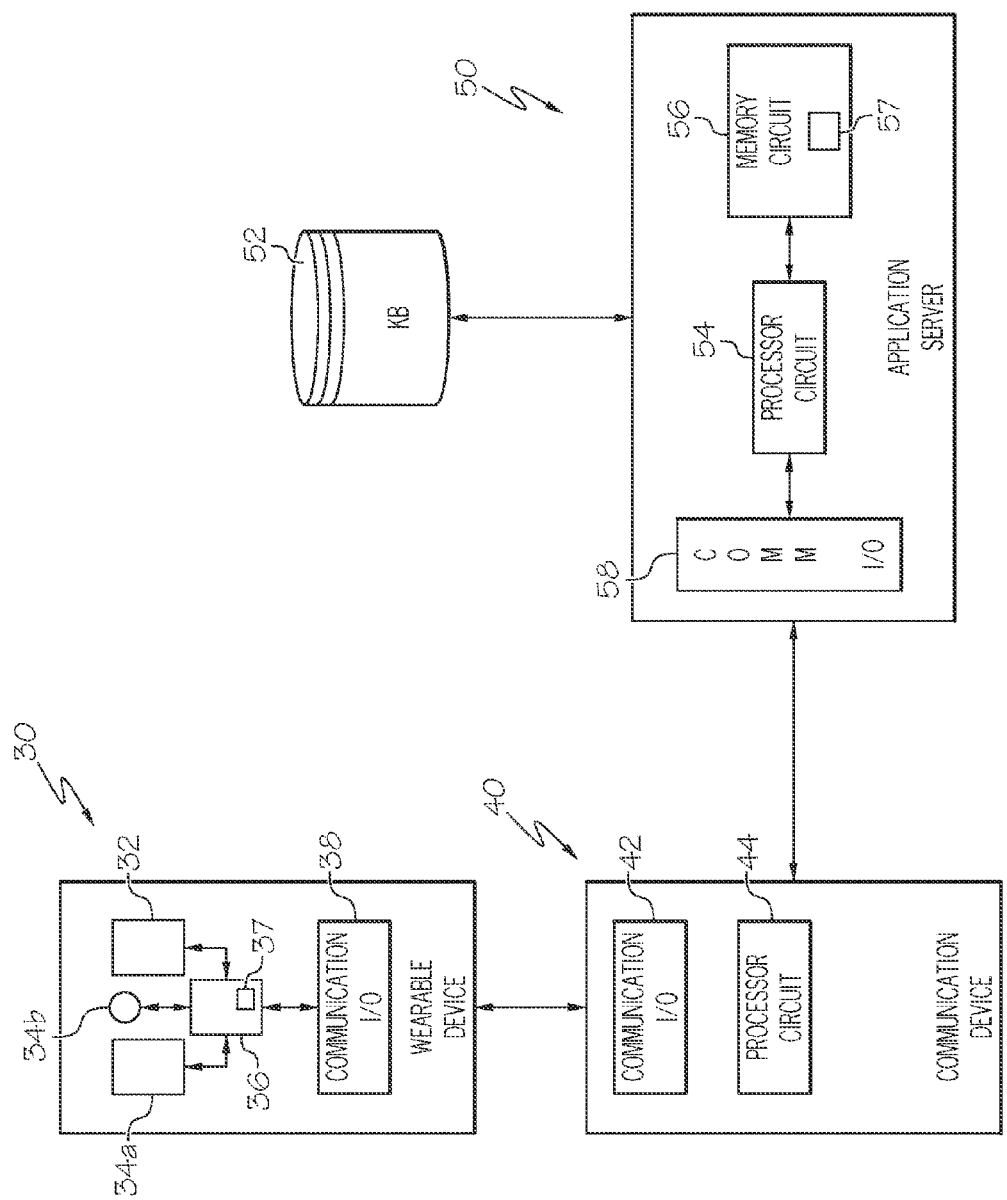
FIG. 7 is a functional block diagram illustrating some of the functional components of a wearable device, a network-based application server, and a user's wireless communication device according to one embodiment of the present disclosure.

FIG. 7 is a block diagram illustrating some functional components of a wearable device 30, a mobile device 40, and the application server 50 according to one embodiment. The wearable computing device 30 comprises an augmented eyewear device such as a GOOGLE GLASS, for example, that is worn on the user's head (as seen in FIG. 2). In this embodiment, the wearable device 30 comprises a visual overlay 32, an interface portion 34 comprising a camera 34*a* and a microphone 34*b*, a processor circuit 36, and a communications Input/Output (I/O) circuit 38. In addition, while not explicitly shown in the figures, the wearable device 30 may also comprise a speaker, a memory circuit, and a power source, such as a rechargeable battery, as known in the art.

As stated above, each of these components that comprise the wearable device 30 is well-known in the art. Thus, these components are not described in detail here. However, it should be noted that the processor circuit 36, which may comprise a microprocessor, for example, is capable of executing an application program 37. Program 37 comprises executable program code that configures the processor circuit 36 to control the interface portion 34 in accordance with the previously embodiments described. More particularly, the application program 37, which may be downloaded from a server, such as application server 50 via the IP network 12, for example, is stored in a memory circuit (not shown) on the wearable device 30. When executed by processor circuit 36, the wearable device 30 receives commands, messages comprising assistance data, and signals from the application server 50 via the communication I/O circuit 38. The program 37 also configures the processor circuit 36 to format these received commands, messages, and signals into control signals to control the operations and functions of the camera 34*a* and microphone 34*b* as previously described. Additionally, the program 37 controls the processor circuit 36 to send the assistance data, which may comprise the defined steps of a diagnostic method, part information, and/or audio from a remote user, for example, to the visual overlay 32 and speaker. In the other direction, the processor circuit 36 communicates images and video captured by the camera 34*a*, as well as audible sound recorded using microphone 34*b*, to the application server 50 via communications I/O circuit 38.

In some embodiments, the communication I/O circuit 38 comprises the transceiver circuitry that enables the wearable device 30 to communicate with the application server 50 via the IP network 12 and/or one or more other communications networks, such as a cellular network. In other embodiments, however, the wearable device 30 is not configured for cellular communications. Therefore, in at least one embodiment, a user's mobile device 40 functions as a relay device that relays data and information between the communications I/O circuit 38 of wearable device 30 and the application server 50.

More particularly, the mobile device 40 may comprise a cellular telephone or other computing device configured for cellular operation. In such embodiments, the mobile device 40 comprises, in addition to other components that are not expressly seen in the figures, a communications I/O circuit 42 and a processor circuit 44 (e.g., a microprocessor). The communications I/O circuit 42 is configured to communicate data and information with other devices, such as the wearable device 30, via a short-range radio interface such as the well-understood BLUETOOTH protocol. In these embodiments, the processor circuit 44 of mobile device 40 may be configured to receive data and information from the application server 50, format that information and data into a format compatible with the wearable device 30, and then send that formatted information and data to the wearable device 30 via communications circuit 42. In the other direction, the processor circuit 44 is configured to receive data and multimedia information from the wearable device 30 (e.g., captured images, videos, and audible sound), format that received data and information into a format that is compatible with the IP network 12 and/or application server 50, and then communicate that information and data to the application server 50.

The application server 50 comprises, as stated previously, a network-based computing device that communicates with remote devices via IP network 12. To that end, application server 50 comprises, in one or more embodiments of the present disclosure, a processor circuit 54, a memory circuit 56 that stores a control application program 57, and a communications I/O circuit 58. Other components may also exist, as is known in the art, but are not shown here for clarity.

The processor circuit 54 may be implemented by one or more microprocessors, hardware, firmware, or a combination thereof, and generally controls the operation and functions of application server 50 according to logic and instructions stored in the memory circuit 56. Such operations and functions include, but are not limited to, communicating data and information with the wearable device 30, the mobile device 40, the remote user devices 70, the help desk attendant 60, and the KB 52. In addition, the processor circuit 54 is capable of executing the control application program 57, which comprises programmable code and instructions to configure the application server 50 to function according to the embodiments previously described. Such functions include, but are not limited to, crowdsourcing images, sound, and other information received from the wearable device 30, categorizing tasks for which a user requested assistance, and retrieving and presenting related assistance data to the user via the user's wearable device 30.

The memory circuit 56 may comprise any non-transitory, solid state memory or computer readable media known in the art. Suitable examples of such media include, but are not limited to, ROM, DRAM, Flash, or a device capable of reading computer-readable media, such as optical or magnetic media. The memory circuit 56 stores the application program 57 that when executed by the processor circuit 54, controls application server 50 to perform the functions previously described according to the embodiments of the present disclosure.

The communications I/O circuit 58 may comprise any communication interface circuit known in the art that enables the application server 50 to communicate data and information with the user's wearable device 30 and/or mobile device 40, the help desk attendant 60, the remote user devices 70, and the KB 52 via IP network 12. For example, the communications I/O circuit 58 in one embodiment comprises an interface card that operates according to any of standards that define the well-known ETHERNET protocol. However, other protocols and standards are also possible with the present disclosure.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method, the method comprising:
   receiving, at a server device, a request for assistance with a task from a user via a communications network;
   controlling, responsive to receiving the request, a wearable device worn by the user to capture multimedia information associated with an object, wherein the object is associated with the task and is positioned within the user's field of view;
   receiving, at the server device, the captured multimedia information from the wearable device;
   storing the multimedia information in a knowledgebase;
   crowdsourcing the multimedia information to a plurality of remote devices;
   determining, at the server device, a category for the task based on information about the multimedia information from a remote device;
   retrieving assistance data based on the category of the task;
   sending the assistance data from the server device to the wearable device worn by the user;
   monitoring data communicated between the user and a user of a remote device;
   detecting a pattern in the data, wherein the pattern comprises information associated with the task; and
   responsive to detecting a pattern in the data:
      extracting the information associated with the task from the data;
      annotating the multimedia information with the extracted information associated with the task; and
      updating the multimedia information in the knowledge base with the extracted information associated with the task.

2. The computer-implemented method of claim 1 wherein the wearable device comprises a camera, and wherein the multimedia information comprises an image captured by the camera.

3. The computer-implemented method of claim 2 further comprising controlling one of a focus function, a pan function, and a zoom function of the camera on the wearable device.

4. The computer-implemented method of claim 2 further comprising:
   performing, at the server device, an image recognition analysis on the captured image; and
   determining, at the server device, the category for the task based on the image recognition analysis.

5. The computer-implemented method of claim 2 wherein crowdsourcing the image to a plurality of remote devices comprises:
   identifying a group of selected devices from the plurality of remote devices; and
   sending the captured image to each of the selected devices.

6. The computer-implemented method of claim 2 further comprising:
   archiving the captured image in the knowledge base; and
   downloading the captured image from the knowledge base to a remote user.

7. The computer-implemented method of claim 1 wherein the wearable device comprises a microphone, and wherein the multimedia information comprises audible sound captured by the microphone.

8. An application server comprising:
   a communications interface configured to receive a request for assistance with a task from a user via a communications network; and
   a processing circuit communicatively connected to the communications interface and configured to:
      control, responsive to receiving the request, a wearable device worn by the user to capture multimedia information associated with an object, wherein the object is associated with the task and is positioned within the user's field of view;
      receive the multimedia information from the wearable device;
      store the multimedia information in a knowledgebase;
      crowdsource the multimedia information to a plurality of remote devices;

determine a category for the task based on information about the multimedia information from a remote device;
retrieve assistance data based on the category of the task;
send the assistance data from the server device to the wearable device worn by the user;
monitor data communicated between the user and a user of a remote device;
detect a pattern in the data, wherein the pattern comprises information associated with the task; and
responsive to detecting a pattern in the data:
 extract the information associated with the task from the data;
 annotate the captured multimedia information with the extracted information associated with the task; and
 update the multimedia information stored in the knowledge base with the extracted information associated with the task.

9. The application server of claim 8 wherein the multimedia information comprises one of a still image and a video, and wherein processor circuit is further configured to control a camera on the wearable device to capture the one of the still image and the video.

10. The application server of claim 9 wherein the processor circuit is further configured to:
 perform an image recognition analysis on the one of the still image and the video; and
 determine the category for the task based on the image recognition analysis.

11. The application server of claim 9 wherein the assistance data comprises one of diagnostic information associated with performing the task, part information for the object in the one of the still image and the video, and an indicator of a remote user that can assist the user with performing the task.

12. The application server of claim 8 wherein the multimedia information comprises audible sound, and wherein the processor circuit is further configured to control a microphone on the wearable device to capture the audible sound.

13. The application server of claim 12 wherein the processor circuit is further configured to:
 perform an analysis on the recorded audible sound; and
 determine the category for the task based on the analysis the recorded audible sound.

14. The application server of claim 8 wherein the processor circuit is further configured to:
 identify a group of selected devices from the plurality of remote devices; and
 send the captured multimedia information to each of the selected devices.

15. A computer program product comprising a non-transitory computer-readable storage medium configured to store a control application that, when executed by a processing circuit on an application server, configures the processing circuit to:
 receive a request for assistance with a task from a user via a communications network; and
 control, responsive to receiving the request, a wearable device worn by the user to capture multimedia information associated with an object;
 receive the multimedia information from the wearable device;
 store the captured multimedia information in a knowledgebase;
 crowdsource the multimedia information to a plurality of remote devices;
 determine a category for the task based on information about the multimedia information from a remote device;
 retrieve assistance data based on the category of the task; and
 send the assistance data from the server device to the wearable device worn by the user;
 monitor data communicated between the user and a user of a remote device;
 detect a pattern in the data, wherein the pattern comprises information associated with the task; and
 responsive to detecting a pattern in the data:
  extract the information associated with the task from the data;
  annotate the captured multimedia information with the extracted information associated with the task; and
  update the multimedia information stored in the knowledge base with the extracted information associated with the task.

16. The computer program product of claim 15 wherein the wearable device comprises one or both of a camera and a microphone, and wherein the control application further configures the processing circuit to:
 control the camera to capture one of a still image and a video of the object; and
 control the microphone to capture audible sound associated with the object.

* * * * *